(12) United States Patent
Mansell et al.

(10) Patent No.: US 7,657,694 B2
(45) Date of Patent: Feb. 2, 2010

(54) HANDLING ACCESS REQUESTS IN A DATA PROCESSING APPARATUS

(75) Inventors: David Hennah Mansell, Cambridge (GB); Stuart David Biles, Little Thurlow (GB); Stephen John Hill, Austin, TX (US)

(73) Assignee: ARM Limited, Cambridge (GB)

( * ) Notice: Subject to any disclaimer, the term of this patent is extended or adjusted under 35 U.S.C. 154(b) by 367 days.

(21) Appl. No.: 11/641,969

(22) Filed: Dec. 20, 2006

(65) Prior Publication Data

US 2008/0155167 A1  Jun. 26, 2008

(51) Int. Cl.
*G06F 21/00* (2006.01)
(52) U.S. Cl. .......................................... 711/6
(58) Field of Classification Search ........................ None
See application file for complete search history.

(56) References Cited

U.S. PATENT DOCUMENTS 7,343,434 B2 * 3/2008 Kapoor et al. ................ 710/56
7,496,495 B2 * 2/2009 Solomon et al. .............. 703/26
2006/0123172 A1 * 6/2006 Herrell et al. ............... 710/269

* cited by examiner

*Primary Examiner*—Sanjiv Shah
*Assistant Examiner*—Duc T Doan
(74) *Attorney, Agent, or Firm*—Nixon & Vanderhye P.C.

(57) ABSTRACT

A data processing apparatus is provided comprising processing logic for issuing access requests when access to data is required, with each access request specifying a memory address associated with the data the subject of the access request. Access control logic is used to perform an access control operation to check for each access request whether the specified memory address is accessible by the processing logic. Further, a table is provided having a plurality of entries, each entry identifying an address range and an associated action. On occurrence of one or more predetermined events, the access control logic references the table to determine whether the specified address is within the address range identified by an entry of the table. If so, the associated action specified in that entry is invoked, whereas otherwise the access control logic causes any action indicated by the access control operation to be performed. This provides a particularly efficient mechanism for handling access requests in a variety of situations, for example within a virtualization environment where the access requests are directed to virtual devices implemented by hypervisor software.

18 Claims, 10 Drawing Sheets

| VIRTUAL ADDRESS | SIZE | ACTION | STATUS FIELDS |
|---|---|---|---|
| | | | |
| | | | |
| ⋮ | ⋮ | ⋮ | ⋮ |
| | | | |

FIG. 7

| ACCESSIBILITY FLAG | VALID FLAG | MEANING |
|---|---|---|
| 0 | 0 | ENTRY INVALID |
| 0 | 1 | ONE-SHOT VALID |
| 1 | 1 | UNLIMITED ACCESS, NOT ACCESSED |
| 1 | 0 | UNLIMITED ACCESS, ACCESSED |

FIG. 10

HANDLING ACCESS REQUESTS IN A DATA PROCESSING APPARATUS

TECHNICAL FIELD

The technology described herein relates to techniques for handling access requests in a data processing apparatus, and more particularly, to the handling of such access requests in a data processing apparatus that supports a virtualisation environment.

BACKGROUND

In a typical virtualisation environment, a processing device such as a processor core is arranged to execute hypervisor software which supports the execution of multiple virtual machines on that processing device. Each virtual machine will have one or more applications running on a particular operating system, with the hypervisor software acting as an interface layer between the virtual machine and the underlying hardware to enable the provision of appropriate hardware support to the virtual machine. Via the hypervisor software layer each virtual machine gets a particular view of the system in which it resides, and in particular gets a particular view of the available hardware resources of the system. Each virtual machine operates independently of other virtual machines on the system, and indeed is not necessarily aware of the presence of other virtual machines.

Accordingly, in an example system, one virtual machine may be executed which runs a particular operating system, for example Microsoft Windows, whilst another virtual machine is executed running a different operating system, for example Linux.

When developing a virtualisation environment, it is frequently necessary to provide virtual devices, such devices being software versions of hardware devices that the software running inside a virtual machine then uses. Often, devices within the system are memory mapped, and in such cases the simplest way to emulate such a device as a virtual device is to have any memory access to that device produce an exception such as a data abort, which can then be trapped by the virtual device handler which can then emulate the desired behaviour.

However, such an approach gives rise to a potential performance issue, since there is a significant overhead in taking each abort, dispatching it to the appropriate routine, and then returning to the original program. In many situations, a significant number of device accesses may occur in quick succession, thereby significantly increasing the overhead if each access is handled in the above manner. This in turn can give rise to a significant adverse effect on performance, and can increase latency. As an example, when such an approach is used for the interrupt controller, it increases the delay before incoming interrupts can be handled.

It may be envisaged that one way to seek to alleviate this performance impact would be to map the virtual device to actual memory, such that the registers of the virtual device that would typically be read from or written to are mapped in memory so that they can be directly accessed. This would provide a performance improvement, since instead of issuing an abort the access can merely be performed in the standard manner, resulting in the content of the particular memory address being read in the event of a read to the virtual device, or data being written to the specified memory address in the event of a write to the virtual device. However, whilst this can potentially address the performance impact, it is a poor substitute for the earlier described technique, as it requires every possible device register to be evaluated in advance, and cannot cope with registers which change upon repeated accesses. Furthermore, it cannot directly implement any side effects that would naturally occur when accessing particular registers of a device. For example, considering as an example device a UART (Universal Asynchronous Receiver Transmitter) device, a write to a send register of the UART would typically cause some send operation to be performed. Clearly, the act of merely writing to an address in memory cannot achieve this, and instead it would be necessary to rely on the hypervisor software to later analyse the memory address in question to determine that it had changed, and to instigate the required operation.

Accordingly, it would be desirable to provide an improved technique for handling access requests within a virtualisation environment.

SUMMARY

Viewed from a first aspect, the technology described herein provides a data processing apparatus comprising: processing logic for issuing access requests when access to data is required, each access request specifying a memory address associated with the data the subject of the access request; access control logic for performing an access control operation to check for each access request whether the specified memory address is accessible by the processing logic; a table having a plurality of entries, each entry identifying an address range and an associated action; the access control logic being operable on occurrence of one or more predetermined events to reference the table to determine whether the specified address is within the address range identified by an entry of the table; if the specified address is within the address range identified by an entry of the table, the access control logic being operable to cause the associated action specified in that entry to be invoked; and if the specified address is not within the address range identified by an entry of the table, the access control logic being operable to cause any action indicated by the access control operation to be performed.

In accordance with the technology described herein, a table is provided, wherein each entry of the table can be populated to specify an address range and an associated action. On occurrence of one or more predetermined events, the access control logic handling an access request can reference the table to determine whether the specified address of the access request is within the address range identified by an entry of the table. If it is, then the access control logic is arranged to cause the associated action specified in that entry to be invoked, whereas otherwise the access control logic causes any action indicated by the standard access control operation to be performed. This arrangement hence enables certain accesses to be handled in accordance with the standard access control operation performed by the access control logic, whilst other accesses are performed in accordance with actions set out in the table.

This hence provides a mechanism for enabling certain access requests to be handled in a manner different to that that would be indicated by the access control operation, but without introducing a significant performance impact. Such a technique may be applicable in a variety of situations, but in one embodiment is implemented within a data processing apparatus having a virtualisation environment such as that described earlier. In accordance with such a system, the use of the table entries can enable accesses to virtual devices to be handled without the need to issue an exception, in particular in situations where those accesses can be predicted, and accordingly entries can be made in the table ahead of the accesses actually occurring.

The address range identified in each entry may in fact be a single address value, or alternatively can identify a sequence of addresses such that a match with that entry is detected if on a lookup in the table an address in that sequence is specified by an access request.

The one or more predetermined events which are arranged to cause the access control logic to reference the table can take a variety of forms. For example, in some embodiments, such events may occur prior to the access control operation in respect of a particular access request being performed by the access control logic. Hence, in such embodiments, the table is referenced, if a match is detected the associated action is performed, and only if there is not a match is the standard access control operation performed by the access control logic, and any action indicated by that access control operation performed.

However, in an alternative embodiment, said one or more predetermined events comprise a determination by the access control logic when performing said access control operation that the specified memory address is not accessible by the processing logic; if the specified address is within the address range identified by an entry of the table, the access control logic being operable to cause the associated action specified in that entry to be invoked without generating an exception; and if the specified address is not within the address range identified by an entry of the table, the access control logic being operable to cause an exception to be generated. Hence, in accordance with such embodiments, certain address ranges can be marked as not being accessible, so that the usual execution of the access control operation by the access control logic would cause an exception to be generated for such accesses. However, prior to actually deciding to generate such an exception, the access control logic instead references the table to determine whether the memory address specified by the access request matches an address range in the table. If so, the associated action in that entry of the table is invoked without generating an exception, and only if a match is not found in the table is the exception actually generated. Accordingly, considering the earlier-mentioned virtualisation environment embodiment, address ranges associated with virtual devices can be marked as not being accessible, thereby causing the table to be referenced whenever an access is attempted to a virtual device. For cases where that access can be predicted in advance, an entry can be made in the table prior to the access taking place, thereby causing a hit to occur within the table, and the required action to be performed without the need to generate an exception. This can hence provide significant performance benefits when processing such access requests, which can lead to higher overall performance of the data processing apparatus, and lower latencies.

Whilst the techniques of the present invention may be applicable in a variety of situations, in one embodiment the processing logic is operable to execute at least one virtual machine which issues said access requests, the processing logic further operable to execute hypervisor software in response to exceptions generated by the access control logic.

In one embodiment, the data processing apparatus further comprises one or more memory mapped virtual devices implemented by the hypervisor software, when a memory access request specifies a memory address associated with one of said virtual devices, the access control logic being arranged when performing said access control operation to determine that the specified memory address is not accessible by the processing logic. The above described techniques provide a particularly efficient mechanism for handling accesses to such memory mapped virtual devices.

The table can be populated in a variety of ways. In one embodiment, certain accesses are predicted in advance, and entries are made in the table ahead of the accesses occurring. In one particular embodiment, the hypervisor software is operable to detect one or more situations which are likely to cause an access request to subsequently be issued by the at least one virtual machine to one of said virtual devices, and on such detection to populate at least one entry of the table with an appropriate address range and an associated action, whereby if the access request is subsequently issued by the virtual machine, the action specified in that entry of the table will be invoked without an exception being generated.

In one embodiment, each entry in the table comprises one or more status fields whose values are selectively modified when that entry is accessed as a result of the specified address of an access request being within the address range identified by that entry. This enables a record to be maintained as to whether particular entries have been accessed, and in some embodiments such a mechanism can be used to invalidate an entry after it has been accessed.

In one embodiment, the hypervisor software is operable at predetermined points to review the values of the status fields in each entry in order to determine whether that entry has been accessed, and to perform any required maintenance operations resulting from that determination. Such maintenance operations would typically be operations that would be performed by the device being accessed, which in the case of virtual devices are typically implemented by the hypervisor software. Since when the table is accessed, the action identified in the table is invoked without any exception being generated, the hypervisor software is not at that time executed, and hence any required maintenance operations are not invoked at the time the table is accessed. Instead the use of the status fields enables the hypervisor software to perform any such required maintenance operations at a later time when the hypervisor software is executed.

The maintenance operations can take a variety of forms, but in one embodiment are operations required to update the virtual device state as a result of the accesses. For example, an Interrupt Controller (IC) may have an "Interrupt Acknowledge" register—reading of this register returns the value of the interrupt to the OS and also updates the state of that interrupt within the IC to indicate that it has been acknowledged by software. So if the techniques of embodiments of the present invention were used in connection with a virtual device representing such an IC, an entry could be programmed in to the table to identify that when the interrupt acknowledge register is read a given value will be returned. This is enough to allow the OS to continue processing, but it has not updated the virtual state of the IC to indicate that interrupt has been acknowledged. Hence, in accordance with embodiments of the present invention, once the hypervisor software regained control it would determine that the register has been read by referencing the status fields, which would then cause a maintenance operation to be performed to update the state of the virtual IC model accordingly.

Similarly, a UART device typically has a read data register—a read to this register will provide the pending read value to the OS, but also the UART will update its state in response to the data being read. So in a similar way the table entry will allow the OS to receive the data value and continue its operation, but the update to the virtual UART state to indicate that there is one less byte of data waiting to be read will happen later once the hypervisor software regains control and performs the required maintenance operation to update that state.

The actions identified in particular table entries will depend on the type of access that is expected to hit within that entry of the table. For example, in one embodiment, if the access request specifies a read access and the specified memory address is within the address range identified by an entry of the table, the action specified in that entry is the return of data identified in that entry to the processing logic in response to the access request. Hence, in such embodiments, the required data to be read is returned to the processing logic as though it had been accessed from the device to which the access request is issued, but without that device actually being accessed. Hence, for virtual devices, this avoids the need to issue an exception, and invoke an appropriate virtual device handler to emulate the required read behaviour, thereby yielding significant performance improvements.

As another example, in one embodiment, if the access request specifies a write access and the specified memory address is within the address range identified by an entry of the table, the action specified in that entry is a comparison operation to be performed between write data identified by the access request and data identified in that entry, one or more additional actions being invoked if the comparison operation determines that the write data does not match the data identified in that entry. The one or more additional actions invoked if the comparison determines that there is not a match could take a variety of forms, but for example in one embodiment could cause an exception to be generated, so that the hypervisor software is executed and an appropriate virtual device handler routine is executed. There are a number of situations where such a mechanism may be useful. For example, considering as a virtual device a virtual interrupt controller it is typically expected that a particular interrupt input will be masked off once it has been read by the interrupt controller. Typically this is done by the processing logic issuing a write access request to the register within the interrupt controller containing the mask values. In accordance with the techniques of embodiments of the present invention, the hypervisor software can predict that such a write operation is going to occur, can mask off the relevant interrupt, and can populate an entry of the table to identify the relevant address and the expected write value.

When the processing logic subsequently issues a write access request specifying the mask value, the access can proceed with reference to the table without the need to generate an exception, and provided the value being written by the processing logic matches that within the relevant table entry, no further action will be required. However, if it does not match, then one or more additional actions will be required, for example generating an exception to cause the hypervisor software to be executed and appropriate action to be taken. For example, the hypervisor has anticipated that a specific access will occur (i.e. to mask the interrupt which triggered) and may have based further predictions on this. If the access does not proceed as anticipated (for example because some other interrupt is masked off for some reason) the hypervisor will typically need to process this different access immediately because it may affect future predictions that it made.

As another example, in one embodiment, if the access request specifies a write access and the specified memory address is within the address range identified by an entry of the table, the action specified in that entry is the storing of write data identified by the access request into a field of that entry for future reference by a device to which that access request is directed. Hence, in such embodiments, the write data is merely written into a field of that table entry for later reference. Typically, when the hypervisor software is later executed, it will reference that table entry and perform the required write operation, for example by executing the required virtual device handler to perform the write.

As another example of the types of actions that can be specified within the table entries, in one embodiment, the action specified in at least one entry is the execution of a software routine identified in that entry in order to process the access request. Hence, in such embodiments, the action in the relevant entry implements a jump table mechanism to cause a software routine to be executed, this software routine for example being a virtual device handler routine required to emulate operation of the device to which the access request is destined. In such embodiments, this enables the flow of execution to jump directly to the virtual device handler software needing to be executed, without the hypervisor software needing to determine the reason for an exception and hence identify the required virtual device handler software.

As another example of the type of action that can be specified within a table entry, in one embodiment the action specified in at least one entry is an access of the data the subject of the access request with reference to a buffer identified within the entry. Hence, in such embodiments, if a sequence of read or writes is likely to occur to a particular device, then that sequence of read or writes can be placed in a buffer. Typically, when the buffer becomes full, or a certain percent full, then an exception can be generated to cause the required virtual device handler to then be executed to perform the accesses specified in the buffer.

This can be useful in a variety of situations, for example in situations where the device software spends a lot of time writing data in and out of FIFOs. In such embodiments, the hypervisor software can configure a buffer of a certain size, for example a hundred values, and then control can be returned to the virtual machine such that the accesses can proceed with reference to the buffer, and an exception only needs to be generated when the buffer is drained of (in the event of read accesses) or filled with (in the event of write accesses) the one hundred entries.

The status fields can take a variety of forms. However, in one embodiment, for each entry of the table said one or more status fields comprise a valid field which is set to indicate a valid state when the address range and associated action are stored in that entry. In one embodiment, for each entry the valid field is cleared to indicate an invalid state when the access control logic causes the associated action in that entry to be invoked. Hence, by such an approach, a single status field can be used to indicate a valid field which can be referenced by the access control logic, with that field automatically being invalidated as soon as a match occurs in that entry and accordingly the associated action is invoked. This hence enables an entry to be set up for a single access, and ensures that that entry can only be accessed once.

In one embodiment, for each entry of the table said one or more status fields further comprise an accessibility field to identify whether that entry is accessible once or more than once. By use of an accessibility field in combination with the valid field, it is possible to set up certain entries so they can only be accessed once, and other entries so they can be accessed multiple times, but with a record being retained of whether those entries have in fact been accessed.

In one embodiment, for each entry of the table said one or more status fields further comprise a use field which is set when the access control logic causes the associated action in that entry to be invoked. In some embodiments, it may be useful to retain a separate use field keeping a record of whether an entry has been used, rather than relying on a particular encoding of an accessibility flag in combination with a valid flag to indicate such use.

In one embodiment where the action specified in an entry of the table requires the data the subject of the access request to be accessed with reference to a buffer identified within that entry, then the one or more status fields for such an entry may comprise an offset field identifying an offset into the buffer. Each time the buffer is accessed, the offset can be incremented within the offset field such that on a subsequent access the next entry in the buffer is used.

Viewed from a second aspect, the technology described herein provides a method of handling access requests in a data processing apparatus comprising processing logic for issuing access requests when access to data is required, each access request specifying a memory address associated with the data the subject of the access request, and access control logic for performing an access control operation to check for each access request whether the specified memory address is accessible by the processing logic, the method comprising the steps of: providing a table having a plurality of entries, each entry identifying an address range and an associated action; on occurrence of one or more predetermined events, referencing the table to determine whether the specified address is within the address range identified by an entry of the table; if the specified address is within the address range identified by an entry of the table, invoking the associated action specified in that entry; and if the specified address is not within the address range identified by an entry of the table, performing any action indicated by the access control operation.

Viewed from a third aspect, the technology described herein provides a computer program product comprising hypervisor software operable to cause a data processing apparatus in accordance with the first aspect of the present invention, and executing at least one virtual machine, to perform the steps of: providing one or more memory mapped virtual devices; when a memory access request specifies a memory address associated with one of said virtual devices, determining when performing said access control operation that the specified memory address is not accessible by the processing logic; detecting one or more situations which are likely to cause an access request to subsequently be issued by the virtual machine to one of said virtual devices, and on such detection populating at least one entry of the table with an appropriate address range and an associated action; whereby if the access request is subsequently issued by the virtual machine, the action specified in that entry of the table will be invoked without an exception being generated.

BRIEF DESCRIPTION OF THE DRAWINGS

The technology described herein will be described further, by way of example only, with reference to embodiments thereof as illustrated in the accompanying drawings, in which:

FIG. 7 is an example of the fields that may be provided within each entry of the table of FIG. 1 in accordance with one non-limiting, example embodiment;

FIG. 10 schematically illustrates how an accessibility flag and valid flag provided within each entry of the table of FIG. 1 may be encoded in accordance with one non-limiting, example embodiment to identify particular status information with respect to the associated entry of the table.

DETAILED DESCRIPTION

Figure 1:
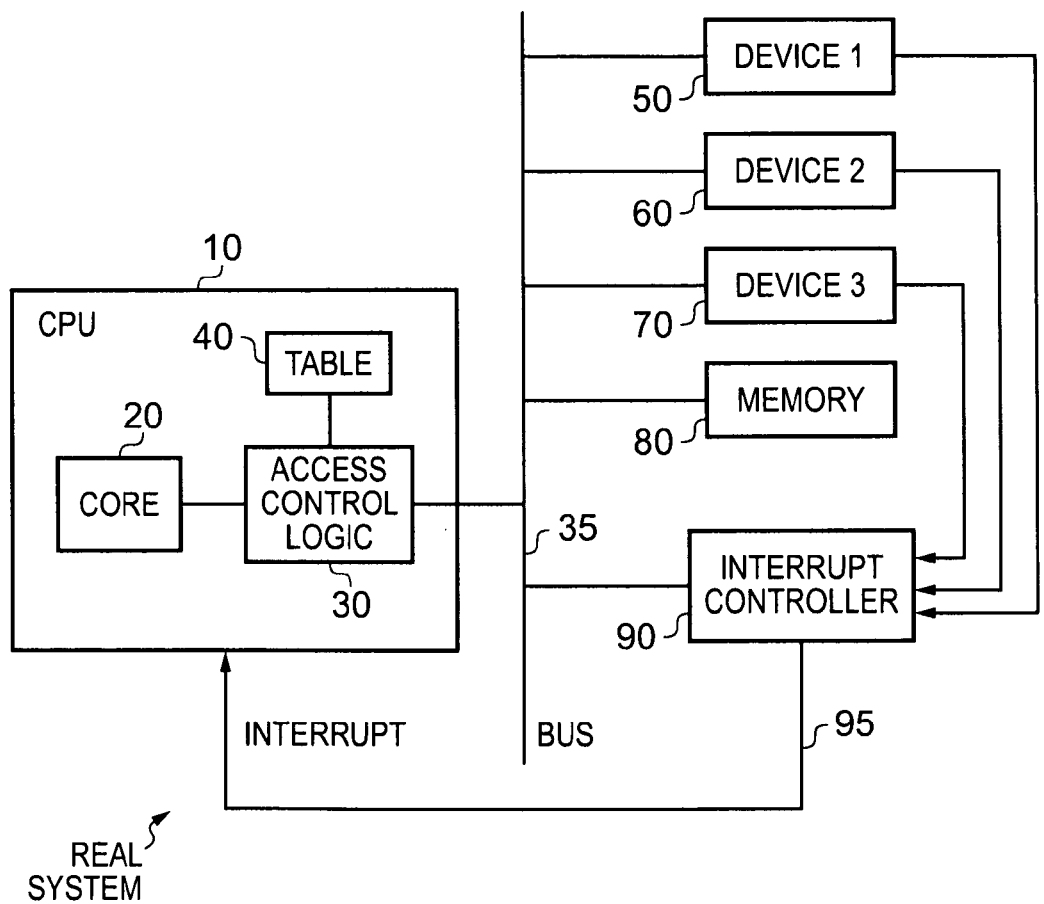
FIG. 1 is a block diagram of a data processing system in accordance with one non-limiting, example embodiment.

FIG. 1 is a block diagram of a data processing system in accordance with one non-limiting, example embodiment of the present invention. As shown in FIG. 1, a central processing unit (CPU) 10 includes a processor core 20 arranged to perform data processing operations. The processor core 20 is connected via access control logic 30 to a bus infrastructure 35 via which it may access memory 80 and one or more devices 50, 60, 70 connected to the bus infrastructure 35. As will be appreciated by those skilled in the art, the devices can take a variety of forms, for example a UART device, a display controller, a sound output device, etc. Typically, such devices are memory mapped, and accordingly include internal storage, for example in the form of registers, which are viewed as part of the overall memory system, which also includes memory 80 and any other additional memory devices in the system.

As also shown in FIG. 1, an interrupt controller device 90 is connected to the bus infrastructure 35, and again may include one or more internal registers that are memory mapped and accordingly accessible by the CPU 10. In particular, the processor core 20 of the CPU 10 may execute one or more setting routines in order to program internal registers within the interrupt controller 90 to control the interrupt controller's operation, for example by enabling or disabling interrupts from particular interrupt sources, etc.

When any of the devices 50, 60, 70 require action to be taken by the processor core 20, they will issue an interrupt to the interrupt controller 90, which for any enabled interrupt sources will prioritise between concurrent interrupts received, so as to select one of the interrupts for handling, after which an interrupt request will be issued over path 95 to the CPU 10. On receipt of the interrupt request, the processor core 20 will typically stall its current operation at a suitable point, and execute an interrupt handling routine in order to perform the operations required to service the interrupt. This may for example cause the processor core to read data from a register of the device issuing the interrupt, to write data to one or more such registers, etc.

Whenever the processor core 20 wishes to access data in the memory system, it issues an access request specifying a memory address associated with the data the subject of the access request. Each access request is received by the access control logic 30, which typically takes the form of a Memory Management Unit (MMU). The MMU is responsible for performing an access control operation in order to perform predetermined access control functions. More particularly, the address specified in the access request is typically a virtual address, and the MMU is responsible for determining the physical address corresponding to that virtual address, and for resolving access permission rights and determining region attributes. Typically, page tables in memory 80 are provided containing a number of descriptors, each descriptor containing information for a memory region from which the MMU 30 can derive access control information required to enable the MMU to perform the predetermined access control functions. Accordingly a descriptor will provide for a particular region of memory information about the virtual to physical address mapping, the access permission rights and any region attributes. The access permission rights will typically identify whether the processor in its current mode of operation is entitled to access the data at the address specified, for example some addresses not being accessible to the user mode, whilst the region attributes will typically identify attributes such as whether the data at the address specified is cacheable, bufferable, etc.

In accordance with one non-limiting, example embodiment, the CPU 10 implements a virtualisation environment, and in particular the processor core 20 is arranged to execute hypervisor software which supports the execution of multiple virtual machines. The hypervisor software enables the provision of appropriate hardware support for each virtual machine, and as a result each virtual machine has its own particular view of the system in which it resides. Whilst each of the devices illustrated in FIG. 1 is a hardware device provided in the real system, it is often necessary in virtualisation environments to provide virtual devices, which are software versions of hardware devices that the software running inside a virtual machine then uses. These virtual devices are typically implemented by the hypervisor software and whilst some virtual devices may have a corresponding real device in the real system, at least some of the virtual devices may have no real hardware counterpart in the system.

As will be discussed in more detail later, in accordance with non-limiting, example embodiments, a table 40 is provided which is accessible by the access control logic 30 when processing access requests so as to enable efficient handling of access requests issued to such virtual devices. In particular, prior to the technology described herein, the page table descriptors would be set up such that when handling an access request to a virtual device, the access control logic 30 would determine that the address was not accessible, and this would cause a data abort to be generated, resulting in a virtual device handler routine being executed to emulate the desired behaviour. However, through use of the table 40, the access control logic 30 can, on occurrence of one or more predetermined events, reference the table 40, the table having a plurality of entries, with each entry identifying an address range and an associated action. If for a particular access request, a hit is detected in one of the entries of the table, then the access control logic causes the associated action specified in that entry to be invoked without generating a data abort, thereby improving performance. This mechanism will be described in more detail later.

Figure 2:
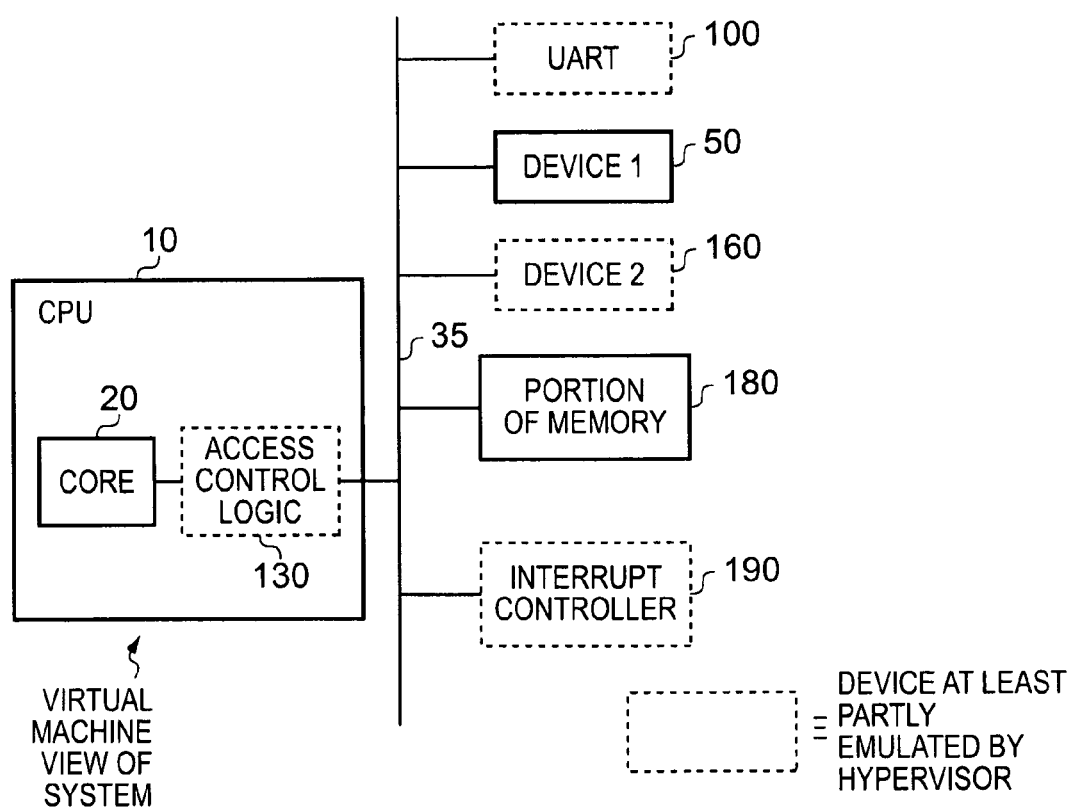
FIG. 2 is a diagram illustrating an example view of the system of FIG. 1 as it appears to one of the virtual machines executing on that system.

FIG. 2 is a diagram illustrating an example view of the system of FIG. 1 as it appears to one of the virtual machines executing on the system. As shown in FIG. 2, the virtual machine sees as the system a system where a UART device 100, device 1 50, device 2 160, a portion of memory 180 and an interrupt controller 190 are connected to the bus infrastructure 35. When the virtual machine is executing on the processor core 20, it will issue access requests when attempting to access any of these devices, which will be processed by the access control logic 130. The virtual machine can access the device 1 hardware 50 in the standard manner, and indeed can access the portion of memory 180 in the standard manner, this portion of memory 180 typically being a subset of the memory 80 shown in FIG. 1 (i.e. not all parts of the memory 80 may be accessible to this particular virtual machine).

The boxes indicated by dotted lines in FIG. 2 indicate devices that are at least partly emulated by the hypervisor software. In particular, with regards to the access control logic 130, the hypervisor software intervenes when the page tables are programmed, during this programming process the hypervisor software emulating some of the functionality of the access control logic. However, when the access control logic is subsequently used to perform the access control operation required for each access request, the standard access control logic hardware 30 shown in FIG. 1 is used.

Considering the UART device 100, it will be seen from a comparison with FIG. 1 that no such hardware device exists within the real system, and this UART device 100 is a purely virtual device implemented by the hypervisor software, typically such a virtual UART device being provided to enable data to be passed between different virtual machines.

The device 2 160 is actually a virtual device representation of the hardware device 2 60 shown in FIG. 1. Hence, whenever the virtual machine seeks to access device 2, it actually accesses the virtual device 160 implemented by the hypervisor software. As an example of the use of such a device, consider the situation where the hardware device 2 60 is a sound output device which has two channels that can output two streams of audio at once. If the virtualisation environment supports two virtual machines, namely virtual machine 1 and virtual machine 2, then the hypervisor software may provide each virtual machine with its own virtual device representation of device 2. Hence, assuming FIG. 2 shows the virtual machine view for virtual machine 1, then the virtual device 2 160 may be arranged to only play one stream of audio at a time. When virtual machine 1 issues a write access request to device 2 60, this write access request is actually processed by the virtual device 2 160, which as discussed earlier is implemented by the hypervisor software. As a result, the hypervisor software will check that the request being made by the virtual machine 1 is not detrimental to any sound output activity currently being undertaken by virtual machine 2, and if not will pass on the request to the real device 2 60, specifying the channel to be used.

Considering the virtual interrupt controller device 190, this again is implemented by the hypervisor to emulate at least some of the functions of the real interrupt controller 90 of FIG. 1.

It will be noted from a comparison of FIG. 1 with FIG. 2 that the virtual machine whose view is as shown in FIG. 2 has no access to device 3 70 of FIG. 1. It may be the case that a different virtual machine provided within the system will have a different view of the system, and hence for example may have access to the device 3 70, but for example may not have access to the device 1 50.

Figure 3:
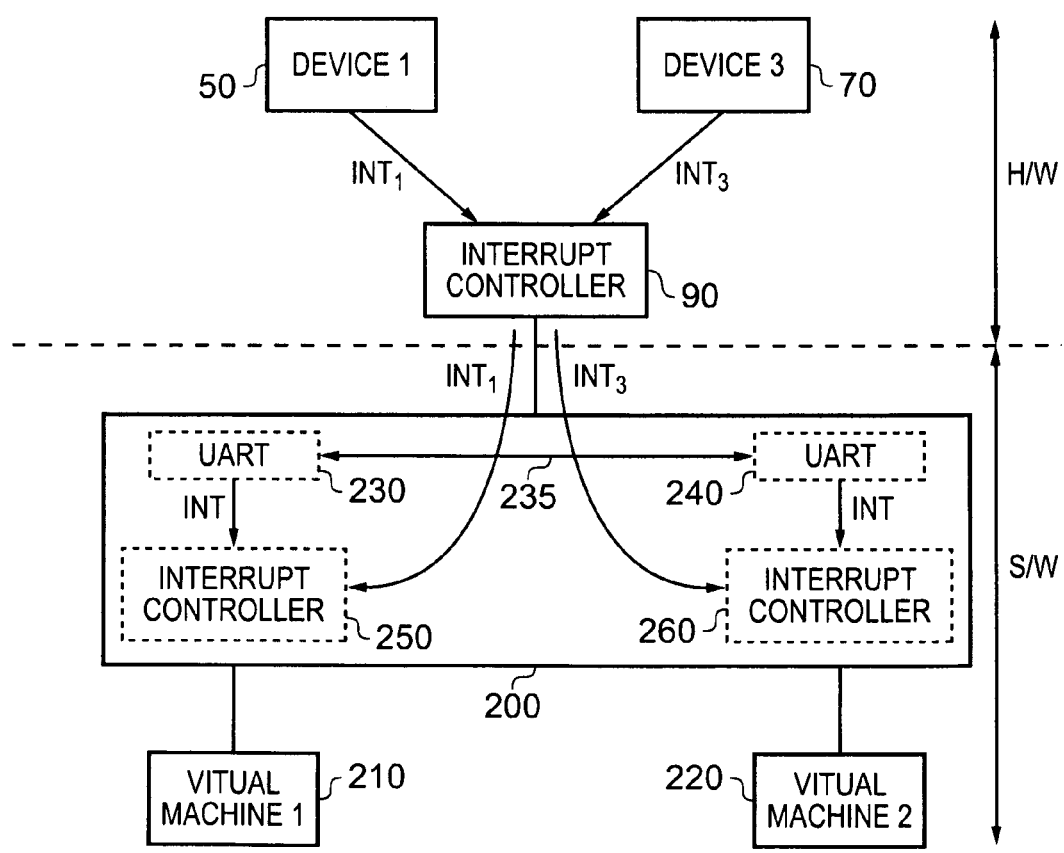
FIG. 3 is a diagram schematically illustrating a system executing two virtual machines, and employing virtual interrupt controller devices and virtual UART devices in association with each virtual machine, in accordance with one non-limiting, example embodiment.

FIG. 3 is a diagram schematically illustrating a system executing two virtual machines, and employing virtual interrupt controller devices and virtual UART devices in association with each virtual machine, in accordance with one non-limiting, example embodiment. As shown in FIG. 3, software executing on the processor core 20 provides a hypervisor software layer 200 supporting the execution of two virtual machines 210 and 220. Within the real system, the interrupt controller 90 is provided for issuing interrupts to the processor core 20, these interrupts being processed in the first instance by the hypervisor software 200. As also shown in FIG. 3, device 1 50 and device 3 70 can issue interrupts to the interrupt controller 90. In the embodiment illustrated in FIG. 3, it is assumed that device 1 50 is visible to virtual machine 1 210, but not to virtual machine 2 220, whilst in contrast device 3 70 is visible to virtual machine 2 220 but not to virtual machine 1 210. It will be appreciated from FIG. 1 that there may be one or more further devices that can issue interrupts to the interrupt controller 90, but for simplicity these have been omitted from FIG. 3.

As shown in FIG. 3, the hypervisor software 200 provides a number of virtual devices, in particular, a virtual UART device 230 associated with virtual machine 1 210, and virtual UART device 240 associated with machine 2 220, these virtual UART devices 230, 240 being coupled by link 235. These virtual UART devices 230, 240 are provided to allow communication between the two virtual machines. As also shown in FIG. 3, the hypervisor software also implements a virtual interrupt controller 250 associated with virtual machine 1 210 and a virtual interrupt controller 260 associated with virtual machine 2 220.

As shown in FIG. 3, if the interrupt controller 90 outputs an interrupt request based on an interrupt received from device 1 50, this interrupt is routed to the virtual interrupt controller 250 associated with virtual machine 1 210, whereas if an interrupt request is output from the interrupt controller 90 related to an interrupt received from device 3 70, this interrupt request is routed to the virtual interrupt controller 260 associated with virtual machine 2 220. As also shown in FIG. 3, if either of the virtual UART devices 230, 240 issues an interrupt, that interrupt is passed to the associated virtual interrupt controller 250, 260 respectively. A further discussion of the operation of the system illustrated schematically in FIG. 3 will be provided in more detail later with reference to the flow diagrams of FIGS. 5 and 6, but first the manner in which access requests to virtual devices are handled in accordance with non-limiting, example embodiments will be described with reference to the flow diagram of FIG. 4.

At step 300, an access request to a virtual device is issued by one of the virtual machines executing on the processor core 20. At step 305, the access control logic 30 determines that access to the specified address is not allowed, as discussed earlier this typically being done by setting up a page table descriptor for the address range associated with the virtual device identifying that access to that address range is not allowed.

In a typical system, such a determination would immediately result in the generation of an abort. However, in accordance with non-limiting, example embodiments, instead a table look up is performed at step 310 in respect of the table 40 to seek to identify whether any of the entries in the table specify an address range which includes the address specified by the access request. At step 315 it is determined whether there is a match with any of the table entries, and if so the action specified in the relevant table entry is performed at step 320. The actions identified in particular table entries will depend on the type of access that is expected to hit within that entry of the table. For example, for a read access, the action may be the return of data identified in that entry, thereby servicing the read access request directly from the contents of the relevant table entry. For a write access, the action may involve the comparison of the write data specified in the access request with some data stored in the entry, with the expectation of a match, but with one or more additional actions being invoked if the comparison does not produce a match. Alternatively, for a write access, the action may specify the storing of write data into a field of the relevant entry for future reference by the hypervisor software.

In one embodiment, the action specified in an entry may be the execution of a software routine identified in that entry in order to process the access request, thereby implementing a jump table mechanism to cause the software routine to be executed, this software routine being for example a virtual device handler routine required to emulate operation of the device to which the access request is destined.

In one embodiment, the action specified in an entry may cause the access request to proceed with reference to a buffer identified within the table entry. This can allow sequences of read or write operations to be performed in respect of the buffer with an exception only being taken when the buffer becomes full (for write accesses) or becomes drained (for read accesses).

As will be discussed in more detail later, each entry in the table also typically includes one or more flags providing status information about that entry, such as whether it is valid, whether it has been accessed, etc. Following performance of the action specified in the table entry at step 320, the flags are updated if appropriate at step 325, whereafter the process proceeds to step 330, where operation of the virtual machine continues.

If a match is not detected at step 315, then an abort is issued to the hypervisor software at step 335. Thereafter, the hypervisor hands off to the appropriate virtual device handler at step 340, whereafter the virtual device handler emulates operation of the device at step 345 in order to take the necessary steps to process the access request. Thereafter, control is returned to the virtual machine at step 350, whereafter operation of the virtual machine continues at step 330.

Accordingly, it can be seen that the four steps within the dotted box 355, namely steps 335, 340, 345 and 350, need to be performed whenever a match is not found in the table 40, and these steps can give rise to a significant performance impact, since they involve the issuance of an abort, the execution of an appropriate virtual device handler routine, and the return of control to the virtual machine issuing the access request. In contrast, whenever a match is detected in the table, the required action can be undertaken directly with reference to the table without the need to issue an abort or perform any virtual device handler routine. Steps 320 and 325 can hence be performed much more quickly than would typically be the case if the four steps indicated in box 355 have to be performed.

Hence, in accordance with non-limiting, example embodiments, the use of the table entries can enable accesses to virtual devices to be handled much more efficiently, in particular in situations where those accesses can be predicted, and accordingly, entries can be made in the table ahead of the accesses actually occurring.

Figure 4:
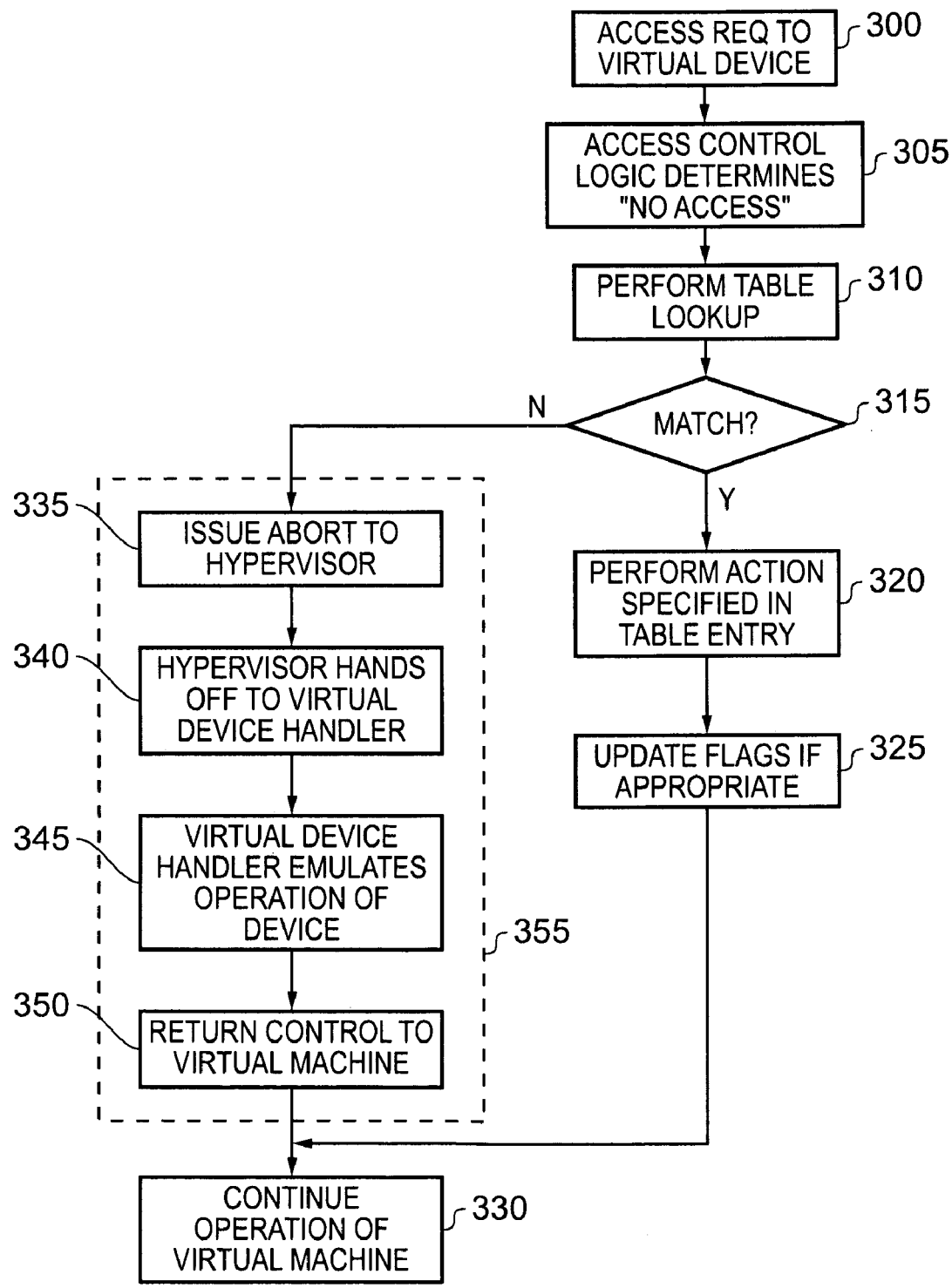
FIG. 4 is a flow diagram illustrating the handling of an access request in accordance with one non-limiting, example embodiment.
Figure 5:
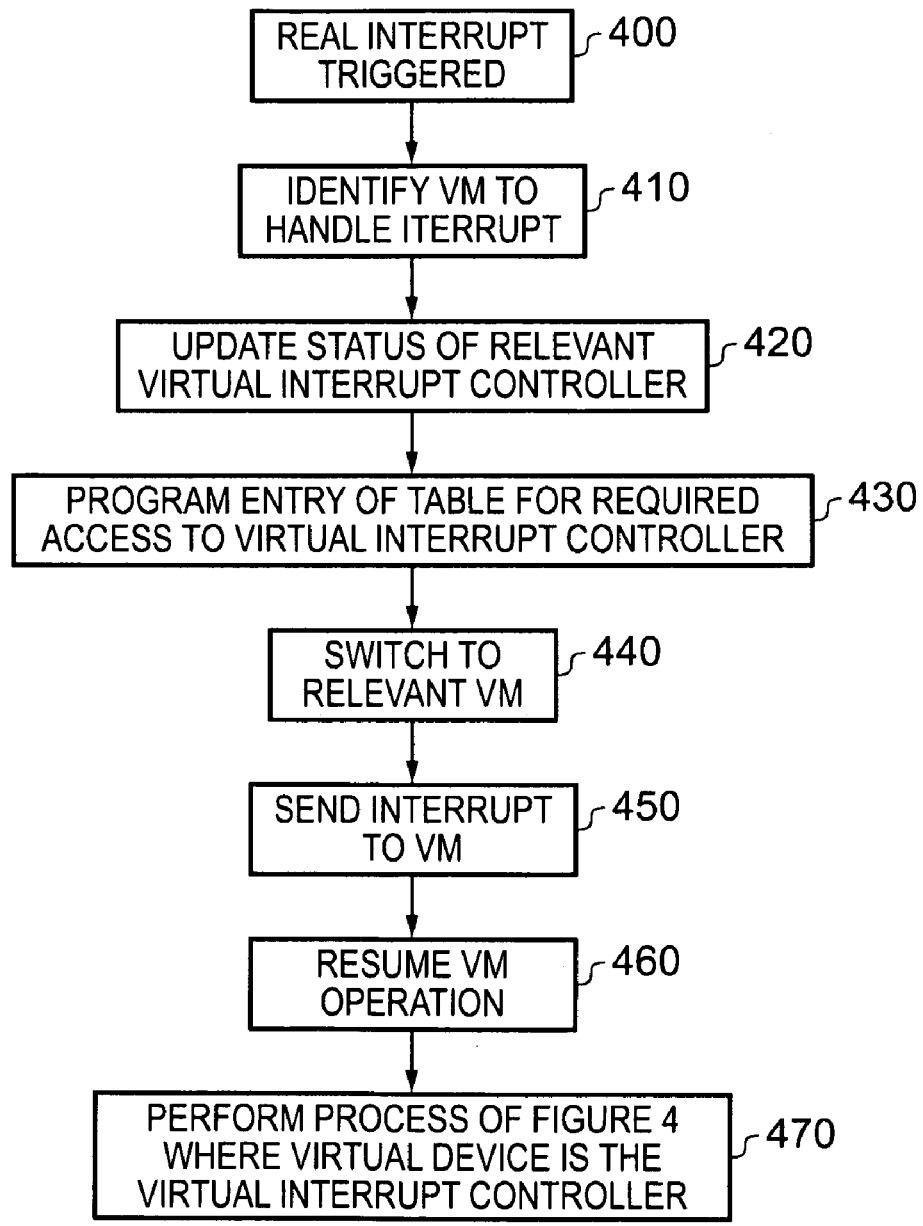
FIG. 5 is a flow diagram illustrating the handling of an interrupt in accordance with one non-limiting, example embodiment.
Figure 6:
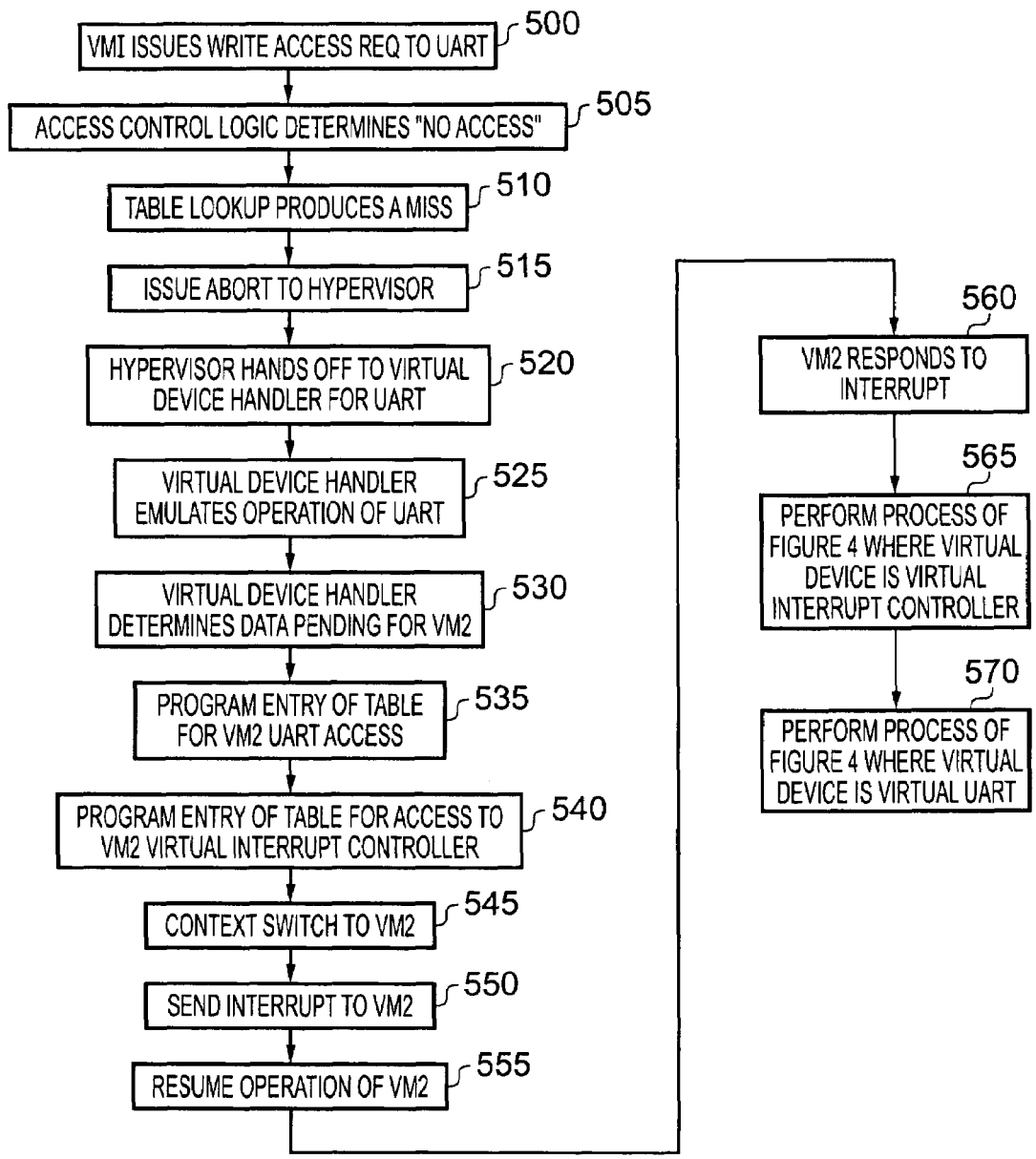
FIG. 6 is a flow diagram illustrating the handling of a write access request to a virtual UART device within the system illustrated in FIG. 3, in accordance with one non-limiting, example embodiment.

FIGS. 5 and 6 illustrate example sequences of events where accesses can be predicted and appropriate table entries made to enable processing of at least some access requests to proceed via the right hand path in FIG. 4, namely via steps 320 and 325, rather than the sequence of steps within the dotted box 355, thereby yielding performance benefits. Considering first FIG. 5, this illustrates a situation where a real interrupt is triggered at step 400, as shown in FIG. 3 such an interrupt being issued by the interrupt controller 90 to the CPU 10, where it is handled in the first instance by the hypervisor software 200.

At step 410 the hypervisor software identifies the virtual machine that should handle the interrupt. Thereafter, at step 420, the hypervisor software updates the status of the relevant virtual interrupt controller. Hence, with reference to FIG. 3, if an interrupt is issued by the interrupt controller 90 based on an interrupt received from device 3 70, then it will be determined that virtual machine 2 should handle the interrupt, and accordingly the status of the virtual interrupt controller 260 will be updated at step 420. In particular, the status will be updated to identify that an interrupt has been received from device 3 70.

Thereafter, at step 430, the hypervisor software programs an entry of the table 40 for the required access to the virtual interrupt controller. In particular, at this point, an entry is made identifying the address that is expected to be specified by an access request subsequently issued by the virtual machine when the virtual machine operation is resumed, and to identify an associated action that should be initiated. In particular, in this example, it is expected that when the virtual machine resumes operation, it will issue an access request seeking to read a particular register of the interrupt controller to identify the source of the interrupt. Accordingly, an entry in the table can be made specifying the address used to access that register, and including the contents of that register, i.e. identifying that device 3 is the source of the interrupt.

The process then proceeds to step 440, where a switch to the relevant virtual machine is made, and then an interrupt is sent to the virtual machine at step 450 by the hypervisor software. Thereafter, at step 460, the operation of the virtual machine resumes, as a result of which the process proceeds to 470, where the process of FIG. 4 takes place. In particular, at step 300 of FIG. 4, the virtual machine will issue a read access request to the virtual interrupt controller device. Due to the fact that an entry in the table has been populated at step 430, a match will be detected at step 315 of FIG. 4, whereafter at step 320 data stored in a field of that table entry will be returned to the virtual machine in response to the read access request, that data identifying the source of the interrupt. The status fields of that entry will also be updated such that later when the hypervisor software regains control it can identify that the entry has been accessed, and update the state of the interrupt controller 260 accordingly to identify that that interrupt has been acknowledged.

FIG. 6 is a flow diagram illustrating another example of a sequence of accesses that may take place, in which the table 40 of FIG. 1 can be used to improve performance. The flow diagram of FIG. 6 illustrates a sequence of steps that may be taken within the system of FIG. 3 discussed earlier. At step 500, the virtual machine 1 210 issues a write access request to the UART device, which in this instance is represented by the virtual UART device 230 implemented by the hypervisor software 200. Thereafter, at step 505 the access control logic 30 determines that the address specified cannot be accessed, as a result of which at step 510 a table lookup is performed within the table 40. However, at this point, it is assumed that the hypervisor software 200 has not previously been able to predict the write access issued at step 500 and accordingly the table lookup performed at step 510 produces a miss.

As a result, an abort is issued to the hypervisor software at step 515, whereafter at step 520 the hypervisor hands off to the virtual device handler for the UART 230. As a result, the virtual device handler emulates the operation of the UART, which may for example identify the write data and pass that write data over path 235 to the other virtual UART device associated with virtual machine 2 220.

At step 530, the virtual device handler will determine that there is data pending for virtual machine 2 220, and based on this determination the hypervisor software can then predict a number of accesses that will subsequently take place and can populate entries of the table accordingly. In particular, at step 535, the hypervisor software programs an entry of the table for the virtual machine 2 220 UART access. In particular, this entry will contain the address that a subsequent access to the UART is expected to specify, and may contain the data to be accessed. Additionally, at step 540, an entry of the table can be programmed by the hypervisor software for the access to the VM 2 virtual interrupt controller 260, such that this entry identifies the address expected to be specified by a subsequent access to the interrupt controller, with that entry also including the data held by the interrupt control at that address, namely an identification that the interrupt originated from the UART.

Thereafter, at step 545, the hypervisor performs a context switch to the virtual machine 2 220, and at step 550 sends an interrupt to the virtual machine 2 220. This causes operation of the virtual machine 2 220 to resume at step 555, after which the virtual machine 2 responds to the interrupt at step 560.

In particular, when responding to the interrupt, the virtual machine 2 220 will issue an access request seeking to access the virtual interrupt controller, hence causing the process of FIG. 4 to be invoked. Since an entry was populated at step 540 with regards to this access, a match will be detected at step 315, and data will be returned at step 320 identifying to the virtual machine 2 that the device to be accessed in response to the interrupt is the UART device. The status fields of that entry will also be updated such that later when the hypervisor software regains control it can identify that the entry has been accessed, and update the state of the interrupt controller 260 accordingly to identify that that interrupt has been acknowledged. Thereafter, at step 570, a second access request will be issued by the virtual machine 2 220, in this case specifying an address associated with the virtual UART device 240. Again, the process of FIG. 4 will be performed, and a match will again be detected at step 315, given that an entry of the table was populated at step 535 with regards to this UART access. This causes the data to be returned by the UART to be provided at step 320, this data being available directly from the entry of the table without the need to generate an abort and execute the virtual device handler for the UART in order to provide the data. Again the status fields of that entry will also be updated such that later when the hypervisor software regains control it can identify that the entry has been accessed, and update the state of the virtual UART 240 accordingly to identify that the data has been read.

Hence, for the process of FIG. 6, it can be seen that two of the three access requests can be handled by pre-population of the table 40 with appropriate entries, enabling those access requests to be responded to without the need to issue an abort.

The individual table entries in the table 40 may be arranged in a variety of ways. However, in one embodiment, the table is arranged as shown in FIG. 7, and in particular each entry 600 contains a field 610 specifying a virtual address and a field 620 specifying a size, collectively these two fields identifying an address range. Field 630 specifies an action to be performed if a hit occurs with respect to that table entry, examples of suitable actions having been discussed earlier. Finally, one or more status fields 640 are provided, which in one embodiment contain one of more flags used to indicate the status of the relevant entry. Examples of suitable flags will be discussed later with reference to FIG. 10.

Figures 8A, 8B:
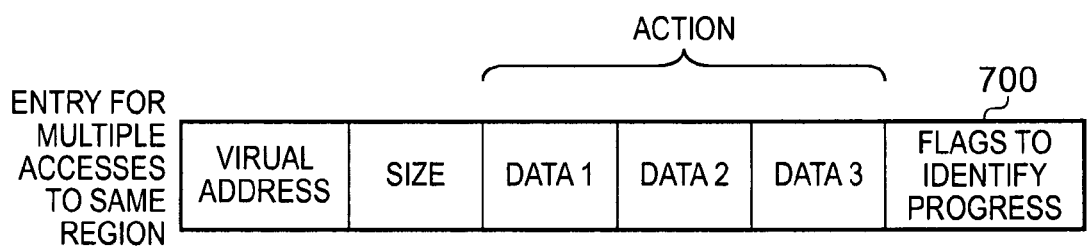
FIGS. 8A and 8B illustrate different mechanisms that can be employed within the table of FIG. 1 in order to handle multiple accesses to a particular region of memory in accordance with one non-limiting, example embodiment.

In some situations, a sequence of accesses may occur to the same address region. FIGS. 8A and 8B illustrate alternative ways in which such accesses can be provided for within the table 40. In the example of FIG. 8A, a single table entry is used for the multiple accesses, with the virtual address and size fields identifying the region in question. In the action field, a number of data items can be represented, each data item representing the data associated with a particular access in the sequence. Hence, in the example of FIG. 8A, it is assumed that a sequence of three accesses are to take place, with data 1 representing the data to be accessed by the first access request, data 2 representing the data to be accessed by the second access request and data 3 representing the data to be accessed by the third access request. The flags contained within the status field will then be used to identify the progress of the access requests, and in particular to identify which of the three data items should be accessed by the next access request. In one particular example, a simple counter can be maintained within the status field, such that when the first access request hits in the entry, the counter is incremented, so that when the next access request hits in that entry, the access proceeds with regards to data item 2 rather than data item 1. Again, the counter is incremented after the second access, to ensure that the third access proceeds with respect to data item 3.

FIG. 8B illustrates an alternative mechanism that can be used for the same sequence of accesses, in this embodiment three separate entries in the table being used, the first entry 710 covering the access to data item 1, the second entry 720 covering the access to data item 2 and the third entry 730 covering the access to data item 3. In such embodiments, it is envisaged that different priorities will be associated with the different entries 710, 720, 730. For the example shown in FIG. 8B, the entry 710 has the highest priority and the entry 730 has the lowest priority. Initially, the flags in the status fields of the entries will identify that all three entries are valid. When the first access takes place, the lookup in the table will identify a hit in all three fields 710, 720 and 730 but priority will be given to the first entry 710, and the access will proceed with respect to that entry. As a result, the flag(s) associated with the entry 710 will be updated to identify that entry as now being invalid. Accordingly, when the second access takes place, a hit will occur in both of the valid entries 720 and 730, but the entry 720 will take priority and accordingly the access will proceed with respect to data item 2. Again, at this point the flag(s) associated with the entry 720 will be updated to mark the entry as invalid. Accordingly, when the third access takes place, the only valid entry in which a hit will be detected is the entry 730, and accordingly the access will proceed with respect to data item 3.

Figure 9:
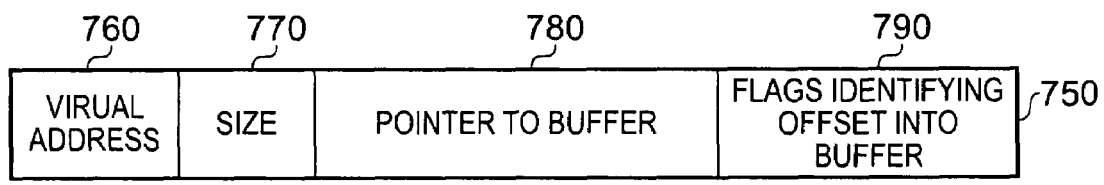
FIG. 9 is a diagram schematically illustrating how an entry of the table of FIG. 1 may be set up to reference a buffer in accordance with one non-limiting, example embodiment.

As mentioned earlier, in some embodiments, the action specified in at least one entry may be an access of the data the subject of the access request with reference to a buffer identified within the entry. In such embodiments, the relevant entry or entries can be arranged as shown in FIG. 9. As shown in FIG. 9, in addition to the usual virtual address and size fields 760, 770, entry 750 may include as its action field 780 a pointer to a buffer. The flags maintained in the status field 790 can then identify an offset to the buffer. Each time a hit occurs with respect to the entry 750, the pointer in the field 780 in combination with the offset in field 790 is used to identify the location in the buffer in which the access should be performed, whether that be a read access of the data contained in the buffer, or a write access writing data to that identified location in the buffer. After each access, the flags in the field 790 are updated to increment the offset into the buffer so that the next time a hit occurs with respect to that entry, a different location in the buffer is accessed. Then, when the buffer becomes full (in the event of a sequence of write accesses) or becomes empty (in the event of a sequence of read accesses) an exception can be generated to cause the required virtual device handler to then be executed to perform the accesses specified in the buffer. This can be useful for example in situations where the device software spends a lot of time writing data in out of FIFOs.

The flags provided in the status fields of each entry can take a variety of forms. In one embodiment, an accessibility flag and a valid flag are provided, which can take the values illustrated in FIG. 10. Accordingly, if both entries have a logic zero value, this indicates that the entry is invalid. If the accessibility flag is clear and the valid flag is set, this indicates a 1-shot valid entry. For such entries, when a hit occurs with respect to that entry, the access proceeds in accordance with the action specified in the action field 630, and thereafter the valid flag is cleared, thereby indicating that the entry is invalid.

If both the accessibility flag and the valid flag are set, this indicates that unlimited access is allowed to the entry, but that it has not yet been in accessed. Accordingly, at the time the entry is populated, the accessibility flag and the valid flag can both be set to allow unlimited access. In accordance with such an embodiment, when the entry is subsequently accessed as a result of a hit, the valid flag is cleared. However, because the accessibility flag is still set, this does not indicate that the entry is now invalid, but merely identifies that the entry has in fact been accessed.

The approach taken in FIG. 10 can provide a very efficient encoding. Alternatively, a separate use flag can be used which can be set once an entry has been accessed.

From the above description of non-limiting, example embodiments, it will be appreciated that such embodiments utilise a table implemented within a CPU and containing details of anticipated accesses. The table has multiple entries, with each entry including an address of the anticipated access (for example a virtual address), the size of the access, the action to be invoked if a hit occurs with respect of that entry, and one or more flags indicating for example whether the entry is valid, whether it has already been used, etc.

Whenever the processor core is about to generate a data abort (for example due to an access to a virtual address corresponding to a "not present" page table entry) it first consults the table to see if there is a match for the address being accessed. If a match is found, rather than producing the abort the action identified in the relevant table entry is performed, and the flags for that entry are updated to indicate that there has been a hit. This can for example be used to prevent the entry from being used again.

Accordingly, when the hypervisor software is in control and can anticipate an access (for example when an interrupt is being sent to the virtual environment, the hypervisor can anticipate that the interrupt controller registers will soon be read), it can establish an entry in the table describing the anticipated access and providing the relevant return value. This eliminates the need for hypervisor intervention if the access then takes place as predicted. When the hypervisor software later regains control it can read the status flags to check whether the access really took place or not, and act accordingly (for example by updating the state of the relevant virtual device).

It has been found that such an approach provides a particularly efficient mechanism for handling access requests to virtual devices in a data processing apparatus having a virtualisation environment.

Although particular non-limiting, example embodiments have been described herein, it will be appreciated that the claims are not limited thereto and that many modifications and additions thereto may be made within the scope of the claims.

We claim:

1. A data processing apparatus comprising:
   processing circuitry for issuing access requests when access to data is required, each access request specifying a memory address associated with the data the subject of the access request;
   access control circuitry for performing an access control operation to check for each access request whether the specified memory address is accessible by the processing circuitry;
   a memory for storing a table having a plurality of entries, each entry identifying an address range and an associated action;
   the access control circuitry being configured on occurrence of a determination by the access control circuitry that the specified memory address is not accessible by the processing circuitry to reference the table to determine whether the specified address is within the address range identified by an entry of the table;
   if the specified address is within the address range identified by an entry of the table, the access control circuitry being configured to cause the associated action specified in that entry to be invoked without generating an exception; and
   if the specified address is not within the address range identified by an entry of the table, the access control circuitry being configured to cause an exception to be generated.

2. A data processing apparatus as claimed in claim 1, wherein the processing circuitry is configured to execute at least one virtual machine which issues said access requests, the processing circuitry further configured to execute hypervisor software in response to exceptions generated by the access control circuitry.

3. A data processing apparatus as claimed in claim 2, further comprising one or more memory mapped virtual devices implemented by the hypervisor software, when a memory access request specifies a memory address associated with one of said virtual devices, the access control circuitry being arranged when performing said access control operation to determine that the specified memory address is not accessible by the processing circuitry.

4. A data processing device as claimed in claim 3, wherein the hypervisor software is configured to detect one or more situations which are likely to cause an access request to subsequently be issued by the at least one virtual machine to one of said virtual devices, and on such detection to populate at least one entry of the table with an appropriate address range and an associated action, whereby if the access request is subsequently issued by the virtual machine, the action specified in that entry of the table will be invoked without an exception being generated.

5. A data processing apparatus as claimed in claim 1, wherein each entry in the table comprises one or more status fields whose values are selectively modified when that entry is accessed as a result of the specified address of an access request being within the address range identified by that entry.

6. A data processing apparatus as claimed in claim 5, wherein the processing circuitry is configured to execute at least one virtual machine which issues said access requests, the processing circuitry further configured to execute hypervisor software in response to exceptions generated by the access control circuitry, and wherein the hypervisor software is configured at predetermined points to review the values of the status fields in each entry in order to determine whether that entry has been accessed, and to perform any required maintenance operations resulting from that determination.

7. A data processing apparatus as claimed in claim 1, wherein if the access request specifies a read access and the specified memory address is within the address range identified by an entry of the table, the action specified in that entry is the return of data identified in that entry to the processing circuitry in response to the access request.

8. A data processing apparatus as claimed in claim 1, wherein if the access request specifies a write access and the specified memory address is within the address range identified by an entry of the table, the action specified in that entry is a comparison operation to be performed between write data identified by the access request and data identified in that entry, one or more additional actions being invoked if the comparison operation determines that the write data does not match the data identified in that entry.

9. A data processing apparatus as claimed in claim 1, wherein if the access request specifies a write access and the specified memory address is within the address range identified by an entry of the table, the action specified in that entry is the storing of write data identified by the access request into a field of that entry for future reference by a device to which that access request is directed.

10. A data processing apparatus as claimed in claim 1, wherein the action specified in at least one entry is the execution of a software routine identified in that entry in order to process the access request.

11. A data processing apparatus as claimed in claim 1, wherein the action specified in at least one entry is an access of the data the subject of the access request with reference to a buffer identified within the entry.

12. A data processing apparatus as claimed in claim 1, wherein each entry in the table comprises one or more status fields whose values are selectively modified when that entry is accessed as a result of the specified address of an access request being within the address range identified by that entry, and wherein for each entry of the table said one or more status fields comprise a valid field which is set to indicate a valid state when the address range and associated action are stored in that entry.

13. A data processing apparatus as claimed in claim 12, wherein for each entry the valid field is cleared to indicate an invalid state when the access control circuitry causes the associated action in that entry to be invoked.

14. A data processing apparatus as claimed in claim 12, wherein for each entry of the table said one or more status fields further comprise an accessibility field to identify whether that entry is accessible once or more than once.

15. A data processing apparatus as claimed in claim 12, wherein for each entry of the table said one or more status fields further comprise a use field which is set when the access control circuitry causes the associated action in that entry to be invoked.

16. A data processing apparatus as claimed in claim 1, wherein the action specified in at least one entry is an access of the data the subject of the access request with reference to a buffer identified within the entry, and wherein for said at least one entry said one or more status fields comprise an offset field identifying an offset into said buffer.

17. A computer program product comprising hypervisor software operable to cause a data processing apparatus as claimed in claim 1, and executing at least one virtual machine, to perform the steps of:
   providing one or more memory mapped virtual devices;
   when a memory access request specifies a memory address associated with one of said virtual devices, determining when performing said access control operation that the specified memory address is not accessible by the processing circuitry;

detecting one or more situations which are likely to cause an access request to subsequently be issued by the virtual machine to one of said virtual devices, and on such detection populating at least one entry of the table with an appropriate address range and an associated action;

whereby if the access request is subsequently issued by the virtual machine, the action specified in that entry of the table will be invoked without an exception being generated.

18. A method of handling access requests in a data processing apparatus comprising processing circuitry for issuing access requests when access to data is required, each access request specifying a memory address associated with the data the subject of the access request, and access control circuitry for performing an access control operation to check for each access request whether the specified memory address is accessible by the processing logic, the method comprising the steps of:

storing a table in memory having a plurality of entries, each entry identifying an address range and an associated action;

on occurrence of a determination by the access control circuitry that the specified memory address is not accessible by the processing circuitry, referencing the table to determine whether the specified address is within the address range identified by an entry of the table;

if the specified address is within the address range identified by an entry of the table, invoking the associated action specified in that entry without generating an exception; and if the specified address is not within the address range identified by an entry of the table, causing an exception to be generated.

* * * * *